Nov. 17, 1959  A. F. E. HULTERSTROM  2,913,026
ADJUSTABLE GUIDE RINGS FOR MILLING MACHINES
Filed June 17, 1957

INVENTOR.
ALBERT FRIDOLF EUGEN HULTERSTRÖM
BY
Irwin S. Thompson
ATTY.

United States Patent Office 2,913,026
Patented Nov. 17, 1959

2,913,026

ADJUSTABLE GUIDE RINGS FOR MILLING MACHINES

Albert Fridolf Eugen Hulterstrom, Hogen, Jonsered, Sweden, assignor to Jonsereds Fabrikers Aktiebolag, Jonsered, Sweden, a corporation of Sweden Application June 17, 1957, Serial No. 666,111

Claims priority, application Sweden June 19, 1956

5 Claims. (Cl. 144—253)

In the manufacture of profiles on work pieces of a readily workable material, such as wood, in milling machines, a guide ring is made use of along which a pattern of the intended shape is being moved, wherein the shape of the pattern is transferred to the shape of the work piece. A condition here is, however, that the guide ring shall as far as possible have the same diameter as that of the cutter used for the time being, in order that the profile produced shall become an accurate reproduction of the profile of the pattern. If the cutter diameter is altered, for instance by regrinding or an exchange for another cutter, either the diameter of the guide ring or the profile of the pattern consequently will have to be altered in a corresponding way, if the work piece is still to have its proper dimensions. Generally, cylindrical guide rings would be exchanged, but the latter may be selected only according to certain standard dimensions of the cutters and therefore do not cover all existing dimensions.

The guide ring according to the present invention has for its object to facilitate a stepless adjustment of the diameter of the guide ring between certain minimum and maximum diameters, and is principally distinguished by the features that a disk is mounted about the work spindle in the table of the milling machine, wherein a spiral-shaped groove is provided for a band of steel or similar resilient material, a stop member being provided to prevent one end of the band from moving in the longitudinal direction of the groove, besides which the disk is rotatable relative to said stop member.

Figure 1:
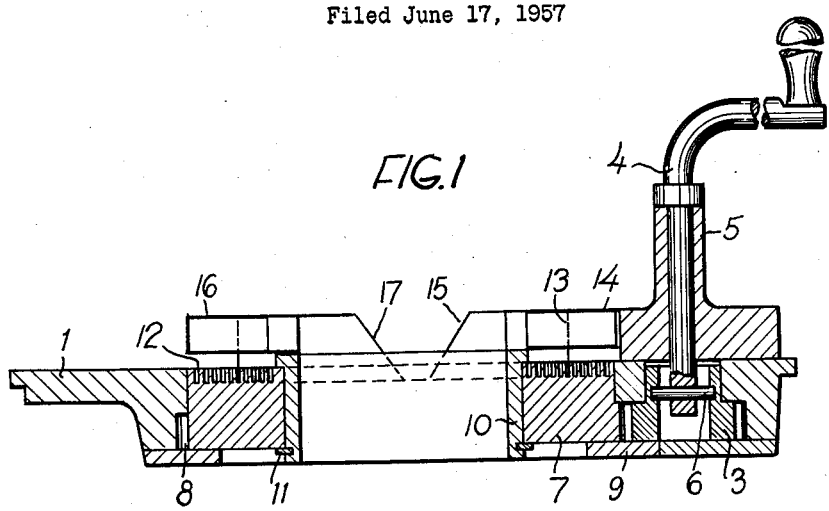
Figure 2:
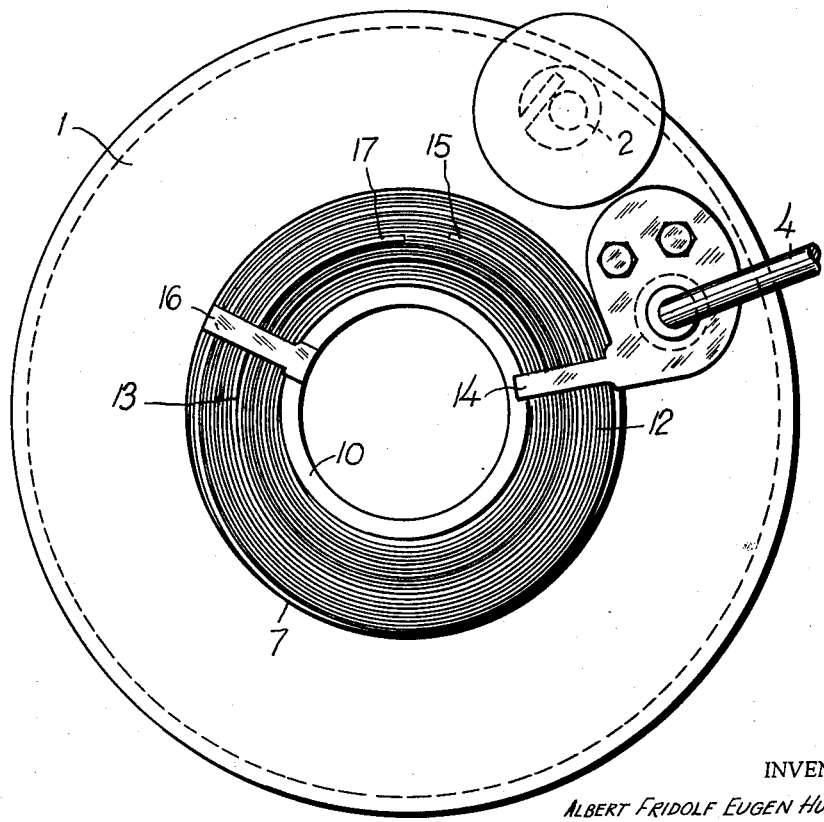

The invention will be described more closely with reference to the accompanying drawing, wherein Fig. 1 shows a section through a work table according to the invention and Fig. 2 shows a plan view of the work table in Fig. 1.

A circular plate 1 is mounted in the work table on a vertical milling machine, said plate being retained in a certain position by means of an eccentric 2 or the like. A gear wheel 3 is built into the plate 1, said gear wheel being rotatable by means of a crank 4, which is removably inserted into a sleeve 5 and provided at the end thereof with a gripping member for a pin 6 or the like mounted at the gear wheel 3. Mounted in the plate 1 is a circular disk 7, the centre of which is somewhat displaced relatively to the centre of the plate 1, and the disk 7 is provided round the circumference thereof with a toothed rim 8 in engagement with the gear wheel 3. A covering disk 9 is screwed onto the lower side of the plate 1, said covering disk keeping the gear wheel 3 and the disk 7 in their places. The disk 7 has a centre aperture for a sleeve 10 through which upwardly projects the work spindle of the machine. The sleeve 10 is rotatably connected to the disk 7 for instance by means of a plate lock 11.

The upper side of the disk 7 is provided with a spiral-shaped groove 12, a resilient band 13 of steel or the like being inserted in an edgewise fashion into said groove, which projects upwardly above the disk 7 and forms the guide surface, against which the pattern is moved during the work. A fixed stop member 14 is mounted on the plate 1, said stop member extending radially inwards over the grooves 12, and a recess is provided in the band 13, so that the band is caused to extend underneatth the stop member on both sides of the latter. The end 15 of the band 13 is bevelled off obliquely with the point at the bottom of the groove, so that said point is caused to guide any occurring splinters from the bottom of the groove 12 when the disk 7 is being turned.

An outwardly directed rail 16 is secured to the sleeve 10, said rail likewise extending radially over the disk 7. The band 13 is provided with a recess for the rail 16, and the object of the latter is to retain the band in its place, so that it cannot be pressed upwardly out of the groove 12. The end 17 of the band is also bevelled off obliquely.

The arrangement functions in the following manner. With a slight spiral pitch of the groove 12, the band 13 forms between the stop member 14 and the rail 16 an approximate circular arc, and through the displacement of the disk 7 by half a pitch relatively to the centre of the work spindle, the centres of the circular arc and the spindle coincide. When the crank 4 is turned in the one or the other direction, the disk 7 will be turned at a lowered speed, and when the band 13 is prevented by the stop member 14 from following in the turning movement, the band 13 will be widened or contracted. Simultaneously, the band is moved radially in the groove 12 along the stop member 14. By the widening and the contraction of the band 13, the non-retained end 17 of the band 13 will move in the direction of the circumference, the rail 16 being thus caused to turn so as to bring the sleeve 10 along with it, and during the movement the band 13 is also moved radially along the rail.

With the arrangement described, any diameter of the band 13 may be rapidly adjusted in a simple manner within its given limit position, whereby a diameter of the guide ring always corresponding to a certain cutter diameter may be obtained.

What I claim is:

1. An adjustable guide for a milling machine work table comprising an annular disk, means mounting the disk for rotation with respect to the work table, said disk being provided with a spiral groove, a band of resilient material inserted in said groove and forming a guide ring, a fixed stop member engaging the band adjacent one end to prevent said one end from moving in the longitudinal direction of said groove, and means for rotating said disk relatively to said stop member and band to vary the diameter of ring formed by the band.

2. A guide according to claim 1 wherein the band is provided with a recess in its upper portion in which the stop member is inserted in order to prevent the band from raising out of the groove while permitting a displacement of the band radially along the stop member.

3. A guide according to claim 2 in which the other end of the band is provided with a recess for a rail secured to a sleeve rotatable within the disc in order to prevent the band from raising out of the groove.

4. A guide ring according to claim 1 in which the ends of the band are bevelled off with the point at the bottom of the groove.

5. An adjustable guide according to claim 1 in which the disk is provided with circumferential gear teeth, and a pinion is provided having its teeth meshing with the circumferential gear teeth of the disk for rotating said disk.

References Cited in the file of this patent
UNITED STATES PATENTS

| | | |
|---|---|---|
| 1,400,472 | White | Dec. 13, 1921 |
| 1,615,893 | Wagner | Feb. 1, 1927 |

FOREIGN PATENTS

| | | |
|---|---|---|
| 80,264 | Switzerland | Feb. 17, 1919 |